(12) United States Patent
Inada (10) Patent No.: US 6,380,690 B1
(45) Date of Patent: Apr. 30, 2002

(54) CAPACITIVE LOAD DRIVE CIRCUIT

(75) Inventor: Yoshiaki Inada, Tokyo (JP)

(73) Assignee: Nippon Precision Circuits Inc. (JP)

( * ) Notice: Subject to any disclaimer, the term of this patent is extended or adjusted under 35 U.S.C. 154(b) by 0 days.

(21) Appl. No.: 09/878,102

(22) Filed: Jun. 8, 2001

(30) Foreign Application Priority Data

Jun. 9, 2000 (JP) .......................................... 12-173993

(51) Int. Cl.$^7$ ............................................... H05B 37/02
(52) U.S. Cl. ..................... 315/169.3; 315/224; 315/226
(58) Field of Search .............................. 315/169.3, 224, 315/226

(56) References Cited

U.S. PATENT DOCUMENTS 5,144,203 A * 9/1992 Fujita et al. ............. 315/169.3

* cited by examiner

Primary Examiner—David Vu
(74) Attorney, Agent, or Firm—Adams & Wilks (57) ABSTRACT

In a capacitive load drive circuit, in order to bring an output terminal used for supplying a drive voltage to a non-selected capacitive load into a high impedance state and in order to prevent the capacitive load from being unnecessarily driven by electric charge flowing to parasitic diodes at the output terminal, such as to prevent a non-selected electroluminescence element from turning on, a synchronizing unit generates second selecting signals by synchronizing first selecting signals to a clock signal constituting a basis of a drive signal of a common inverter for generating drive voltage to a common output terminal of plural electroluminescence elements, a drive signal generating unit brings individual output terminals into the high impedance state based thereon and a timing thereof is synchronized to a timing at which a potential difference between two poles of the non-selected electroluminescence element is nullified.

11 Claims, 5 Drawing Sheets

PRIOR ART

FIG. 5
PRIOR ART

CAPACITIVE LOAD DRIVE CIRCUIT

BACKGROUND OF THE INVENTION

1. Field of the Invention

The present invention relates to a capacitive load drive circuit for selectively driving a plurality of capacitive loads such as EL (electroluminescence) elements.

2. Description of the Related Art

Figure 4:
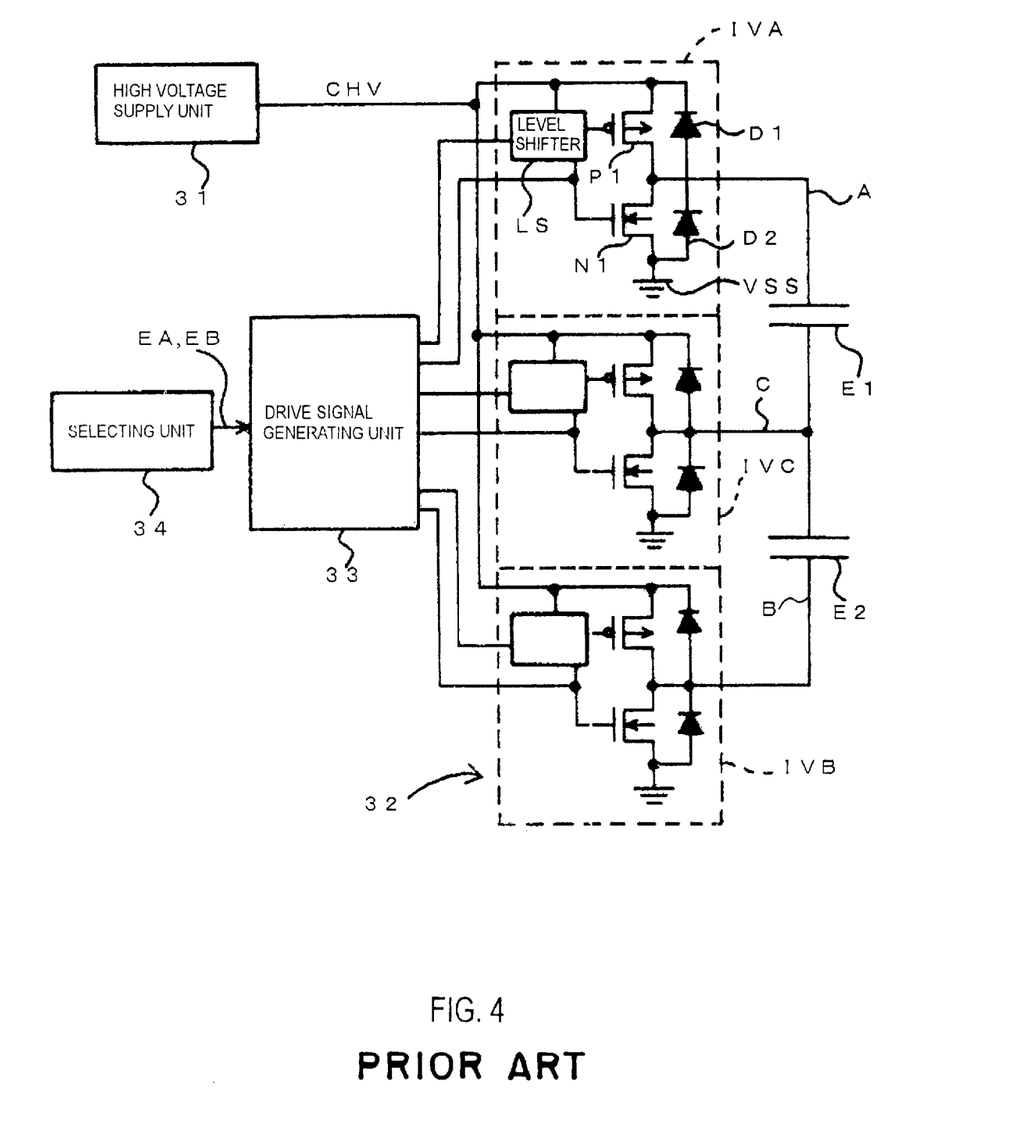
FIG. 4 is a block diagram of a related art capacitive load drive circuit.

Heretofore, there has been a capacitive load drive circuit for driving a plurality of capacitive loads such as EL elements as shown by, for example, FIG. 4. The drive circuit comprises a high voltage supply unit 31 for generating a voltage CHV suitable for driving EL elements E1 and E2, an output unit 32 for selectively outputting the voltage CHV of the high voltage supply unit 31 to the EL elements E1 and E2, a drive signal generating unit 33 for generating a drive signal EA, EB for driving the output unit 32 and a selecting unit 34 for generating a selecting signal for selecting either of the EL elements E1 and E2 to be driven and controlling the drive signal generating unit 33 to drive the selected EL elements.

The output unit 32 comprises inverters IVA and IVB and a common inverter IVC, each having the same construction. The inverters IVA and IVB and the common inverter IVC each comprise a P-channel MOS transistor P1 and an N-channel MOS transistor N1 having interconnected drains. The inverters form a plurality of output terminals A, B and C. A source of the P-channel MOS transistor P1 is connected to the output terminal CHV of the high voltage supply circuit 1 and a source of the N-channel MOS transistor N1 is connected to a reference terminal VSS (e.g., 0V). The P-channel MOS transistor P1 of each of the inverters IVA and IVB and the common inverter IVC is turned ON and OFF by a drive signal the level of which is shifted by a level shifter LS. The N-channel MOS transistor N1 is turned ON and OFF by the drive signal and outputs the voltage generated by the high voltage supply unit 31 from each of the output terminals A, B and C as a drive voltage. There are also parasitic diodes D1 and D2 present across the outputs of the P-channel MOS transistor P1 and the N-channel MOS transistor N1.

One pole of the EL element E1 is connected to the output terminal A and other pole thereof is connected to the output terminal C to thereby form an H bridge circuit with respect to the EL element E1. One pole of the EL element E2 is connected to the output terminal B and other pole thereof is connected to the common output terminal C (hereinafter, referred to as a common output terminal C) to thereby form an H bridge circuit with respect to the EL element E2.

According to a first drive method using the above-described circuit construction, there is a drive method which is characterized by bringing an output terminal of a non-selected EL element, other than the common output terminal, into a high impedance state by means of a selecting signal, even when the output signal is output to the common output terminal, so that a capacitive coupling effect is produced and the non-selected EL element is neither charged nor discharged.

An explanation will be given of operation of the drive circuit of FIG. 4 with reference to the waveform diagrams shown in FIG. 5.

At a point in time after a standby state has ended, the common output terminal C generates a drive voltage C. The phase of the drive voltage C is defined for reference purposes as a positive phase. When the EL element E1 is instructed to turn on by a selecting signal EA output by the selecting unit 34, the output terminal A generates a drive voltage A having a phase inverse to that of the common output terminal C. As a result, the EL element E1 is charged and discharged to thereby turn on. Meanwhile, when the EL element E2 is instructed to turn off by an EL element selecting signal EB, the output terminal B is brought into a high impedance state. Since the EL element is a capacitive load, the potential B' at the output terminal B is varied by an amount that the potential variation at the common output terminal C and the EL element E2 is not charged and discharged to thereby turn off.

Further, two EL elements can be simultaneously turned on by making phases of drive voltages of the output terminal A and the output terminal B inverse to the phase of the common output terminal C and two of the EL elements can be turned off by bringing both the output terminal A and the output terminal B into the high impedance state or turning OFF the high voltage supply unit or an IVC power source.

A second drive method for use with the above-described circuit is characterized in that when an EL element is to be turned on, a drive voltage having a phase inverse to the phase of the drive voltage at the common output terminal is output to the output terminal of the selected EL element (other than the common output terminal). When an EL element is to be turned off, a drive voltage having a positive phase relative to the drive voltage of the common output terminal is applied to the output terminal of the selected EL element (other than the common output terminal).

Figure 5:
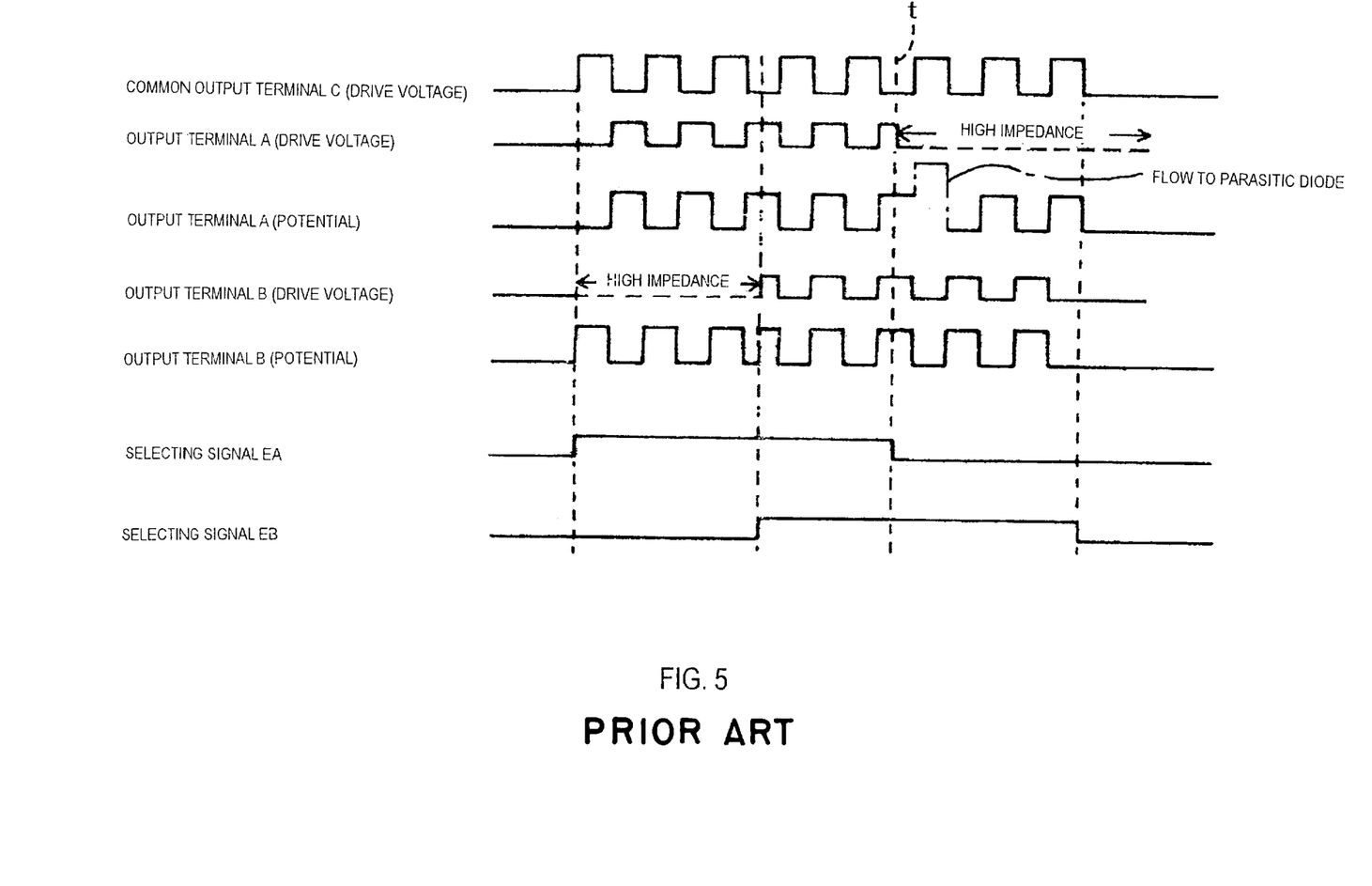
FIG. 5 is a waveform diagram illustrating operation of the capacitive load drive circuit of FIG. 4.

According to the first drive method described above, and as shown in the timing diagrams of FIG. 5, the selecting signals EA and EB non-synchronously supplied to the drive voltages A, B and C are used as signals for switching the drive voltages as they are. Accordingly, there is a high probability that the drive voltage is switched or stopped at a state in which electric charge is stored by the capacitive load. When this occurs and a drive voltage is applied to the common output terminal successively, there is brought about a phenomenon in which electric charge is made to flow or is drawn to the parasitic diodes across the output terminal of the H bridge circuit which is to be brought into the high impedance state. For example, when at timing t of FIG. 5, a state of simultaneously turning on both the EL element E1 and the EL element E2 is switched to a state of in which only one of the EL elements E2 is turned on (i.e., the state of simultaneously turning on the two is changed to the state of turning on one EL element), in the case in which voltage Va of the high voltage supply unit is supplied to both ends of the EL element E1 with the output terminal A as positive, when the drive voltage of the common output terminal C is successively changed to Va, the potential A of the output terminal A becomes 2×Va by virtue of capacitive coupling of the EL element, and potential difference between the two poles of the EL element E1 becomes larger than the voltage Va generated by the high voltage supply unit. Accordingly, current is made to flow to the parasitic diodes. Also, when the polarity of voltage remaining at the EL element E1 is reversed, the potential difference between the two poles of the EL element E1 similarly becomes −2×Va. Accordingly, current is similarly made to flow to the parasitic diodes.

Therefore, unnecessary charging and discharging is carried out with respect to the EL element, and there is a problem in that a non-selected EL is nonetheless lighted.

Further, according to the second drive method described above, although the drive voltages applied to the two poles of an EL lamp which is turned off are provided with the same phase, there is a problem in that the EL lamp may be slightly lit due to a difference in power of driving signals applied at the output terminal or a slight deviation in timing.

SUMMARY OF THE INVENTION

In view of the foregoing problems, it is an object of the present invention to provide a drive system for bringing an output terminal used for supplying drive voltage to a capacitive load into a high impedance state when the capacitive load is caused to stop driving so that the capacitive load is prevented from being unnecessarily driven by the flow of electric charge to parasitic diodes at the output terminal, so that, for example, an EL element serving as a capacitive load is prevented from being turned on.

In order to achieve the above-described object, according to the present invention, there is provided a synchronizing unit which operates such that when an output terminal of one of a plurality of respective capacitive loads is to be brought into a high impedance state in accordance with a selecting signal non-synchronously generated to produce a drive voltage, a timing thereof is synchronized to a timing at which a potential difference between two poles of the capacitive load is nullified.

According to one aspect of the present invention, there is provided a capacitive load drive circuit comprising an output unit including a common output terminal for commonly connecting poles of a plurality of capacitive loads on one side and individual output terminals for respectives of the capacitive loads for connecting poles of the capacitive loads on another side for generating a common drive voltage at a specific frequency at the common output terminal in accordance with a selecting signal used for selecting a respective one of the capacitive loads to be driven, generating a drive voltage having a phase reverse to a phase of the common drive voltage at the individual output terminal corresponding to the selected capacitive load to be driven, and bringing the individual output terminal corresponding to a non-selected capacitive load into a high impedance state, and a synchronizing unit for synchronizing a timing at which the individual output terminal is brought into the high impedance state to a timing at which a potential difference between the two poles of the capacitive load is nullified.

Further, according to another aspect of the present invention, there is provided a capacitive load drive circuit comprising an inverter common to a plurality of capacitive loads for providing a common output terminal for commonly connecting poles of the plurality of capacitive loads on one side by an output terminal thereof, individual inverters for the respective capacitive loads providing individual output terminals connected with poles of the capacitive loads on another side by output terminals thereof, a selecting unit for generating a selecting signal for selecting a capacitive load to be driven, a clock signal generating unit for generating a clock signal at a specific frequency, a drive signal generating unit for generating a first drive signal and a second drive signal having phases inverse to each other based on the clock signal, outputting the first drive signal to the common inverter to drive the common inverter, outputting the second drive signal to the individual inverter corresponding to a selected one of the capacitive loads to be driven based on the selecting signal to thereby drive the inverter, and outputting a stop signal to a non-selected inverter corresponding to a capacitive load not to be driven to thereby bring the individual output terminal of the inverter into a high impedance state. A common drive voltage at the specific frequency is generated at the common output terminal, a drive voltage having a phase inverse to the phase of the common drive voltage is generated at the individual output terminal corresponding to the selected capacitive load to be driven, and the individual output terminal corresponding to the non-selected capacitive load not to be driven is brought into the high impedance state to thereby selectively drive the plurality of capacitive loads. The selecting unit includes a synchronizing unit for generating the selecting signal in synchronism with a timing at which a potential difference between the two poles of the capacitive load is nullified based on the clock signal for bringing the individual output terminal corresponding to the non-selected capacitive load into the high impedance state in synchronism with the timing at which the potential difference between the two poles of the capacitive load is nullified.

Preferably, a plurality of the selecting signals are generated to correspond to the respective capacitive loads in synchronism with the clock signal, the drive signal generating unit generates the first drive signal and the second drive signal in synchronism with the clock signal, the second drive signal is output to the inverter corresponding to the capacitive load in correspondence with the selecting signal during a time period in which the selecting signal is being generated, and the stop signal is output in place of the second drive signal when the selecting signal is interrupted.

Further, it is also preferable that the capacitive load comprises an EL element.

DETAILED DESCRIPTION OF THE PREFERRED EMBODIMENTS

Figure 1:
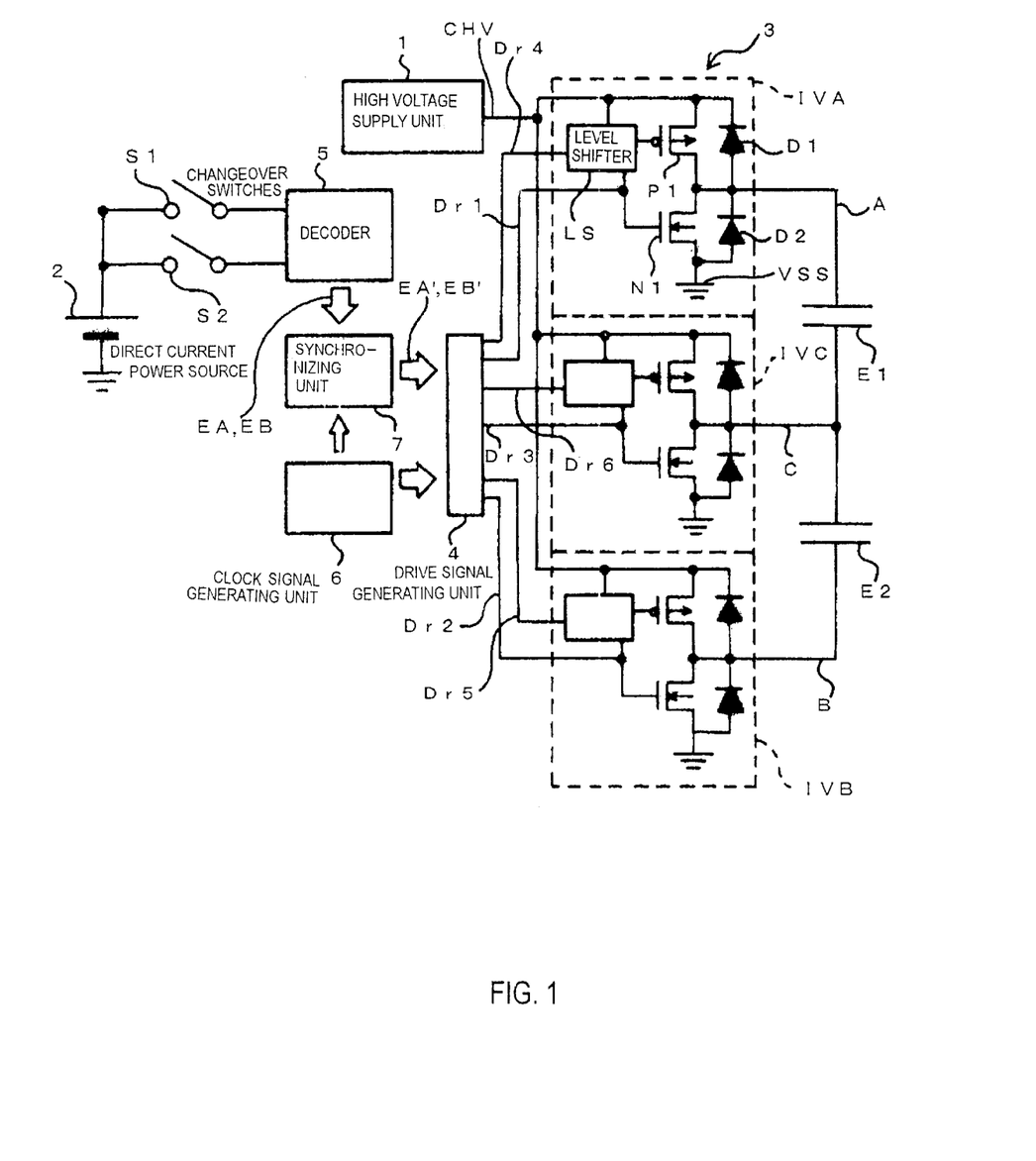
FIG. 1 is a block diagram illustrating a capacitive load drive circuit in accordance with an embodiment of the present invention.

An explanation will be given of details of a capacitive load drive circuit according to the invention in accordance with a first embodiment shown in FIG. 1. According to the preferred embodiment, a plurality of EL elements are used as capacitive loads and FIG. 1 shows a drive circuit for driving the EL elements. The same reference characters as those used in FIG. 4 are used to designate the same or similar elements.

In FIG. 1, although not illustrated, the high voltage supply unit 1 intermittently connects a coil to a direct current power source 2 and drives the coil by a chopper to thereby generate a surge pulse. The surge pulse is applied to a capacitor via a diode to charge the capacitor so that the power source voltage of the direct current power source 2 is elevated to several hundreds of volts and is suitable for driving the EL elements E1 and E2.

An output unit 3 comprises the inverters IVA and IVB and the common inverter IVC, each having the same construction. The drains of the P-channel MOS transistor P1 and the N-channel MOS transistor N1 of each of the inverters IVA and IVB and the common inverter IVC are interconnected to provide the respective output terminals A, B and C, the source of the P-channel MOS transistor P1 is connected to the output terminal CHV of the high voltage supply unit 1, and the source of the N-channel MOS transistor N1 is connected to the reference terminal VSS (e.g, OV). There are also present parasitic diodes D1 and D2 respectively across outputs of the P-channel MOS transistor P1 and the N-channel MOS transistor N1 of each inverter.

The P-channel MOS transistor P1 of each of the inverters IVA and IVB and the common inverter IVC, is turned ON and OFF by a drive signal the level of which is shifted by the level shifter LS and voltage generated by the high voltage supply unit 1 is output from each of the output terminals A, B and C as a drive voltage.

One pole of the EL element E1 is connected to the output terminal A and other pole thereof is connected to the output terminal C to thereby form an H bridge circuit with respect to the EL element E1. One pole of the EL element E2 is connected to the output terminal B and other pole thereof is connected to the output terminal C (hereinafter, referred to as a common output terminal C) to thereby form an H bridge circuit with respect to the EL element E2. When the EL elements E1 and E2 are turned on, phases of drive voltages of the output terminals A and B are made inverse to the phase of the voltage at the common output terminal C and the drive voltages are bidirectionally applied to the two poles of the EL elements E1 and E2 to thereby drive the two poles. As will be appreciated, although the presently described embodiment comprises a drive circuit for driving two EL elements, the invention is not limited to EL elements in general, and may be used to drive three or more capacitive loads such as the EL elements by individually adding inverters to a third one of the elements.

A decoder 5 selects the EL element to be turned on and generates a first selecting signal EA or EB for selecting the EL element to be turned on in accordance with, for example, ON and OFF states of changeover switches S1 and S2 connected to a direct current power source 2.

A clock signal generating unit 6 generates a clock signal for generating drive signals of the inverters IVA and IVB and the common inverter IVC.

A synchronizing unit 7 receives the first selecting signals EA and EB and the clock signal and generates second selecting signals EA' and EB' in synchronism with the clock signal.

A drive signal generating unit 4 outputs the clock signal generated by the clock signal generating unit 6 from terminals Dr1 and Dr2 as drive signals of the inverters IVA and IVB, and outputs a signal having a phase inverse to the phase of the clock signal from a terminal Dr3 as a drive signal of the common inverter IVC. Further, when the output terminal of the respective inverter is brought into the high impedance state, one of the terminals Dr1, Dr2 and Dr3 to be brought into the high impedance state is held to be "L" to thereby turn OFF the N-channel MOS transistor N1 in correspondence therewith, and one of the terminals Dr4, Dr5 and Dr6 in correspondence with the inverter to be brought into the high impedance state is held to be "HI" to thereby turn OFF the P-channel MOS transistor P1 of the inverter in correspondence therewith. While the drive signal generating unit 4 receives the second selecting signals EA' and EB', the drive signal generating unit 4 outputs the drive signal to the inverter corresponding to a selected EL element to be turned on to thereby apply a drive voltage to the EL element and brings the output terminal of the inverter in correspondence with a non-selected EL element to be turned off into the high impedance state. Thereby, the output terminal is brought into the high impedance state at a time at which electric charge is not stored by the non-selected EL element. As a result, the voltage between the two poles of the EL element is prevented from becoming larger than the drive voltage by capacitive coupling in the state wherein electric charge is stored to the EL element when the drive voltage is applied to the common output terminal as in the related art example, and the EL element is prevented from lighting unnecessarily by making current flow to the parasitic diodes.

Figure 2:
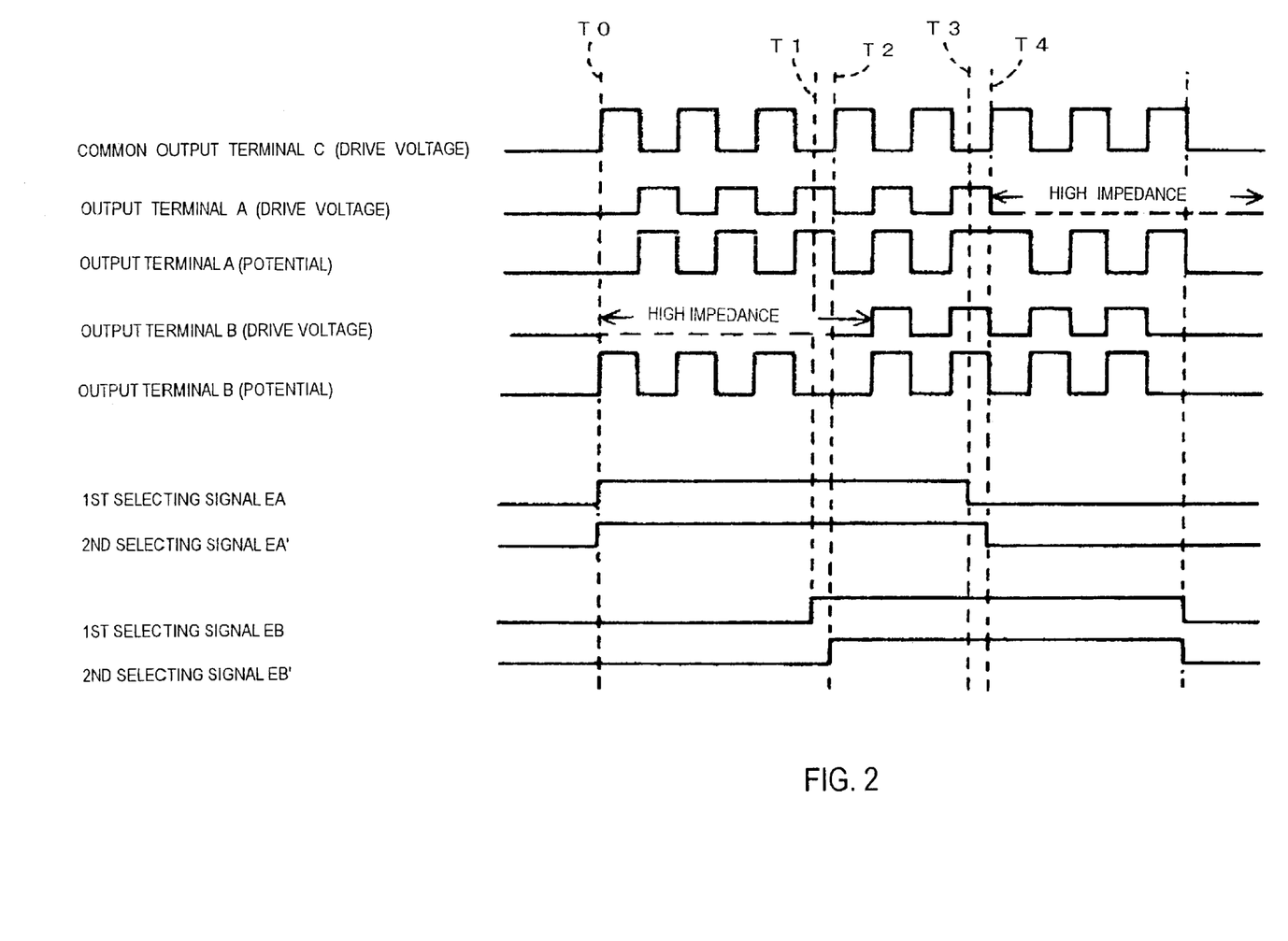
FIG. 2 is a timing chart illustrating operation of the capacitive load drive circuit of FIG. 1.

An explanation will be given of operation of the presently described embodiment with reference to the timing chart of FIG. 2 as follows. In this case, an explanation will be given thereof such that firstly, when both of the changeover switches S1 and S2 are made OFF, there is brought about a standby mode, followed by a state in which the only the EL lamp E1 is turned on from the standby mode, followed by a state in which the EL elements E1 and E2 are simultaneously turned on, and finally, a state in which only the EL element E2 is turned on.

When the changeover switch S1 is turned ON at timing T0, the decoder 5 outputs the first selecting signal EA to the synchronizing unit 7 indicating that the EL element E1 is selected. With respect to the first selecting signal EA, after the supply of power, the synchronizing unit 7 unconditionally outputs the first selecting signal EA as the second selecting signal EA'. At the instance after the standby mode is over, the high voltage generated by the high voltage supply unit 1 is output from the common output terminal C as the drive voltage C at a frequency of the clock signal generating unit 6, a drive voltage having a phase inverse to the phase of the drive voltage of the common output terminal C is generated at the output terminal A of the selected EL element E1, and a high voltage is applied bidirectionally to the two poles of the EL element E1 to thereby turn on the EL element E1. The output terminal B with respect to the non-selected EL element E2 is brought into the high impedance state. At this moment, the potential B' of the output terminal B undergoes capacitive coupling and is varied by an amount of potential variation at the common output terminal C. Accordingly, the EL element E2 is not charged or discharged and the EL element E2 is turned off.

Figure 3:
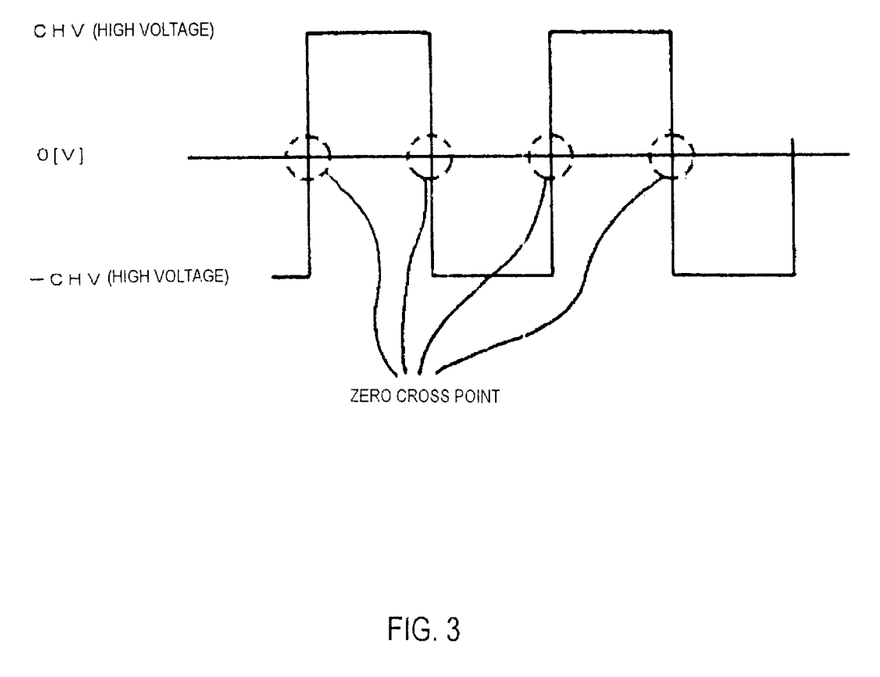
FIG. 3 is a waveform diagram showing a potential difference between two poles of an EL element serving as the capacitive load in the drive circuit of FIG. 1.

Next, when the changeover switch S2 is turned ON at time T1, the decoder 5 outputs the first selecting signal EB to the synchronizing unit 7, indicating that the EL element E2 is selected. When the synchronizing unit 7 receives the first selecting signal EB, the synchronizing unit 7 produces the second selecting signal EB' at timing T2 at which the drive voltage C of the common output terminal C and the drive voltage A of the output terminal A become 0V. That is, when the first selecting signal EB is received, the second selecting signal EB' is made to rise in synchronism with rise of a successive clock signal. By receiving the second selecting signal EB', the drive signal generating unit 4 outputs the clock signal to the inverter IVB as a drive signal, a drive voltage having a phase inverse to the phase of the drive voltage of the common output terminal C is generated at the output terminal B, and a high voltage is bidirectionally applied to the two poles of the EL element E2 to thereby turn on the EL element E2. Thereby, both of the EL elements E1 and E2 are turned on. The timing T2 is a timing indicating a zero cross point of a waveform of potential difference between the two poles of the EL element shown in FIG. 3. In the drawing, the potential at the common output terminal C is made positive for convenience. That is, the positive side is varied between the ground potential (0V) and the potential CHV of the output terminal CHV by alternately connecting the common output terminal C to ground (terminal VSS) and the output terminal CHV of the high voltage supply unit 1, the negative side is varied between the ground potential and the potential CHV by alternately connecting the output terminal A (or output terminal B) to ground and the output terminal CHV. By synthesizing these, there is provided the waveform of the potential difference between the two poles of the EL element as shown in the drawing.

Next, when the changeover switch S1 is turned OFF at timing T3, the decoder 5 stops generating the first selecting signal EA. The synchronizing unit 7 causes the second selecting signal EA' fall at a timing at which the drive voltage C of the common output terminal C and the drive voltage A of the output terminal A successively become 0V by receiving the fall of the first selecting signal EA, that is, at timing T4 at which the waveform of the potential difference between the two poles of the EL element successively indicates the zero cross point. That is, the second selecting signal EA' is made to fall in synchronism with the rise of the successive clock signal by receiving the fall of the first selecting signal EA. By receiving the second selecting signal EA', the drive signal generating unit 4 stops supplying the drive signal to the inverter IVA, holds the terminal Dr3 to an "H" level, and brings the output terminal A into the high impedance state. Thereby, the EL element 1 is turned off and a single one of the EL element E2 stays turned on. Further, when the changeover switch S2 is turned OFF, the EL element E2 is turned off by a similar operation.

At a time at which the drive voltage C of the common output terminal C and the drive voltage A of the output terminal A successively become 0V, that is, at time T4 at which the waveform of the potential difference between the two poles of the EL element successively indicates the zero cross point, the EL element E1 finishes discharging and the EL element E1 is not stored with electric charge. The output terminal A is brought into the high impedance state at this time and accordingly, it is not brought about that by capacitive coupling when electric charge is stored by the EL element when the drive voltage is applied to the common output terminal C, voltage higher than the drive voltage provided to the output terminal A or voltage lower than the ground potential is applied thereto and current is made not flow to the parasitic diodes by the excessive voltage as in the related art example. The EL element E1 is not unnecessarily lit by such current and the inverter IVA is not by the excessive voltage.

Although a description has been given of a preferred embodiment in which EL elements are used as the capacitive load, the invention is applicable not only to EL elements but also to a drive circuit used to drive other capacitive loads, for example, a piezoelectric resonator.

Although according to the above-described embodiment, the second selecting signals EA' and EB' are synchronized to the timing at which both of voltage of the common output terminal C and voltage of the output terminal A (and/or output terminal B) become 0V, the second selecting signals EA' and EB' may alternatively be synchronized to a timing at which the potential difference between the two poles of the capacitive load is nullified.

According to the present invention, there is not applied a voltage higher than a drive voltage normally applied to an output terminal which is to be brought into the high impedance state or a voltage lower than the ground potential. As a result, destruction of the output unit can be prevented. In addition, a capacitive load is not unnecessarily driven and a state of driving the capacitive load is stabilized. For example, in the case of the EL element, the EL element is not turned on unnecessarily and can stay turned off when desired.

What is claimed is:

1. A capacitive load drive circuit comprising:

a selecting circuit for generating selecting signals for selecting one or more of a plurality of capacitive loads to be driven;

an output unit including a common output terminal for commonly connecting first poles of the plurality of capacitive loads and outputting a common drive voltage at a specific frequency to the capacitive loads in accordance with a selecting signal for selecting one or more of the capacitive loads to be driven, and a plurality of individual output terminals each connected to a second pole of the respective capacitive loads for outputting a drive voltage having a phase reverse to that of the common drive voltage to one or more selected capacitive loads that are to be driven and for bringing individual output terminals corresponding to one or more non-selected capacitive loads that are not to be driven into a high impedance state; and a synchronizing unit for synchronizing the time at which individual output terminals are to be brought into the high impedance state with the time at which a potential difference between the two poles of the corresponding non-selected capacitive loads is nullified.

2. A capacitive load drive circuit according to claim 1; further comprising a high voltage supply unit for supplying a high voltage to drive the capacitive loads.

3. A capacitive load drive circuit according to claim 2; wherein the high voltage supply unit comprises a direct current power source, a coil, means for intermittently connecting the coil to the direct current power source to generate a surge pulse, and a capacitor for elevating the output voltage of the direct current power source to a level sufficient to drive the capacitive loads.

4. A capacitive load drive circuit according to claim 2; wherein the output unit comprises a plurality of inverters for receiving selecting signals and the high voltage output of the high voltage supply unit, and including a common inverter having the common output terminal and individual inverters each having a respective one of the individual output terminals.

5. A capacitive load drive circuit according to claim 3; wherein each of the inverters has a P-channel MOS transistor and an N-channel MOS transistor having interconnected drains, a source of the P-channel MOS transistor being connected to an output terminal of the high voltage supply unit, and a source of the N-channel MOS transistor being connected to a reference terminal, and parasitic diodes respectively connected across outputs of the P-channel MOS transistor and the N-channel MOS transistor.

6. A capacitive load drive circuit according to claim 5; wherein the first and second poles of each of the capacitive loads are connected to the common output terminal and one of the individual output terminals to form an H bridge circuit with respect to the respective capacitive load.

7. A capacitive load drive circuit according to claim 1; wherein the capacitive loads comprise electroluminescence elements.

8. A capacitive load drive circuit comprising:

an inverter common to a plurality of capacitive loads and having a common output terminal for supplying a common drive voltage to first poles of the plurality of capacitive loads;

a plurality of individual inverters for the capacitive loads each having an individual output terminal for supplying an individual drive voltage to a second pole of the capacitive loads;

a selecting unit for generating a selecting signal for selecting a capacitive load to be driven;

a clock signal generating unit for generating a clock signal having a specific frequency; and a drive signal generating unit for generating a first drive signal and a second drive signal having phases inverse to each other based on the clock signal, outputting the first drive signal to the common inverter to drive the common inverter, outputting the second drive signal to an individual inverter corresponding to a selected capacitive load to be driven based on the selecting signal to drive the individual inverter, and outputting a stop signal to an individual inverter corresponding to a non-selected capacitive load not to be driven to bring the individual output terminal of the individual inverter into a high impedance state;

wherein the common drive voltage is generated at the specific frequency at the common output terminal, an individual drive voltage having a phase inverse to that of the common drive voltage is generated at the individual output terminal correspondence to the selected capacitive load to be driven, and the individual output terminal corresponding to the non-selected capacitive load that is not to be driven is brought into the high impedance state to thereby selectively drive the plurality of capacitive loads; and wherein the selecting unit includes a synchronizing unit for generating the selecting signal in synchronism with a time at which a potential difference between the two poles of the non-selected capacitive load is nullified based on the clock signal for bringing the individual output terminal corresponding to the non-selected capacitive load into the high impedance state in synchronism with the time at which the potential difference between the two poles of the non-selected capacitive load is nullified.

9. A capacitive load drive circuit according to claim 8; wherein the capacitive loads comprise electroluminescence elements.

10. A capacitive load drive circuit according to claim 8; wherein a plurality of the selecting signals are generated corresponding to the respective capacitive loads in synchronism with the clock signal, the drive signal generating unit generates the first drive signal and the second drive signal in synchronism with the clock signal, the second drive signal is output to the individual inverter corresponding to the capacitive load in accordance with the selecting signal during a time period in which the selecting signal is being generated, and the stop signal is output in place of the second drive signal when the selecting signal is interrupted.

11. A capacitive load drive circuit according to claim 10; wherein the capacitive loads comprise electroluminescence elements.

* * * * *